United States Patent
Speece et al.

(10) Patent No.: US 6,969,219 B2
(45) Date of Patent: Nov. 29, 2005

(54) CARGO ANCHOR FOR A TRUCK SIDEWALL TOP PLATE

(76) Inventors: Donald R. Speece, 6032 Sandy Hill La., Yorba Linda, CA (US) 92886; Donald S. Egigian, 412-203 Arenoso, San Clemente, CA (US) 92672

( * ) Notice: Subject to any disclaimer, the term of this patent is extended or adjusted under 35 U.S.C. 154(b) by 0 days.

(21) Appl. No.: 10/685,928

(22) Filed: Oct. 14, 2003

(65) Prior Publication Data
US 2005/0079026 A1   Apr. 14, 2005

(51) Int. Cl.[7] .............................................. B61D 45/00
(52) U.S. Cl. .................................................... 410/106
(58) Field of Search ................................ 410/101, 102, 410/106, 107, 108, 109, 110, 111, 113, 116; 24/265 CD, 115 K; 248/499

(56) References Cited

U.S. PATENT DOCUMENTS

| | | | |
|---|---|---|---|
| 3,351,356 A * | 11/1967 | Clark et al. ................. | 410/110 |
| 3,421,726 A | 1/1969 | Getter ......................... | 248/361 |
| 3,595,125 A | 7/1971 | Jacobs ........................... | 85/76 |
| 3,950,010 A | 4/1976 | Robertson ............... | 280/179 R |
| 4,607,991 A * | 8/1986 | Porter ......................... | 410/110 |
| 4,762,449 A * | 8/1988 | St. Pierre et al. ........... | 410/107 |
| D308,627 S | 6/1990 | Guffey ........................ | D8/356 |
| D309,251 S | 7/1990 | Palmer ........................ | D8/367 |
| 4,948,311 A * | 8/1990 | St. Pierre et al. ........... | 410/107 |
| 4,958,875 A * | 9/1990 | Zamzow ..................... | 296/32 |
| D332,389 S | 1/1993 | Dinges ........................ | D8/356 |
| 5,326,203 A | 7/1994 | Cockrell ..................... | 410/110 |
| 5,409,335 A | 4/1995 | Beck .......................... | 410/105 |
| 5,738,471 A | 4/1998 | Zentner et al. ............. | 410/110 |
| D408,267 S | 4/1999 | Egigian et al. ............. | D8/354 |
| 5,971,683 A | 10/1999 | Hunt .......................... | 410/106 |
| 6,256,844 B1 | 7/2001 | Wheatley ............... | 24/265 CD |
| 6,290,441 B1 * | 9/2001 | Rusu .......................... | 410/106 |
| 2001/0002973 A1 | 6/2001 | Price .......................... | 410/106 |

* cited by examiner

*Primary Examiner*—H. Gutman
(74) *Attorney, Agent, or Firm*—Gene Scott & Patent Law & Venture Group

(57) ABSTRACT

A cargo anchor with a cover plate having a peripheral edge is extensive for covering a panel aperture in the upfacing surface of a side wall of a truck. An anchor bar for securing an anchor line is engaged with the cover plate. A locator plate is fastened to the cover plate with screws and is positioned within a well associated with the panel aperture. The locator plate engages a flange tube within the truck sidewall, limiting movement of the cargo anchor so that a space between the panel aperture and the peripheral edge of the cover plate cannot occur.

3 Claims, 5 Drawing Sheets

US 6,969,219 B2

CARGO ANCHOR FOR A TRUCK SIDEWALL TOP PLATE

BACKGROUND OF THE INVENTION

Incorporation by Reference

Applicant(s) hereby incorporate herein by reference, any and all U.S. patents, U.S. patent applications, and other documents and printed matter cited or referred to in this application.

1. Field of the Invention

This invention relates generally to anchors for tie lines and more particularly to such an anchor capable of being used with a variety of trucks and enabled for preventing unsightly gaps to appear between the cover plate and an aperture covered by the cover plate.

2. Description of Related Art

Our prior patent, U.S. D408,267 defines the present state of the art in this field. In this reference the use of a vertically movable tie bar is taught, but the assembly is complex. The present invention has simplified the design of this hardware item and enabled it to be used with a wide range of trucks.

SUMMARY OF THE INVENTION

The present invention teaches certain benefits in construction and use which give rise to the objectives described below.

The present invention is a cargo anchor with a cover plate having a peripheral edge extensive for covering a panel aperture in the upfacing surface of a side wall of a truck. An anchor bar for securing an anchor line is engaged with the cover plate. A locator plate is fastened to the cover plate with screws and is positioned within a well associated with the panel aperture. The locator plate engages a flange tube of the well within the truck sidewall, limiting movement of the cargo anchor so that a space between the panel aperture and the peripheral edge of the cover plate cannot occur.

A primary objective of the present invention is to provide an apparatus and method of use of such apparatus that provides advantages not taught by the prior art.

Another objective is to provide such an invention capable of securing an anchor line of cargo in a truck bed.

A further objective is to provide such an invention capable of clamping to the truck sidewall in a manner assuring that no gap exists between the invention and an aperture in the truck sidewall that secures the invention.

A still further objective is to provide such an invention capable of moving a tie-off point into a well to place it out of sight.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

Figure 1:
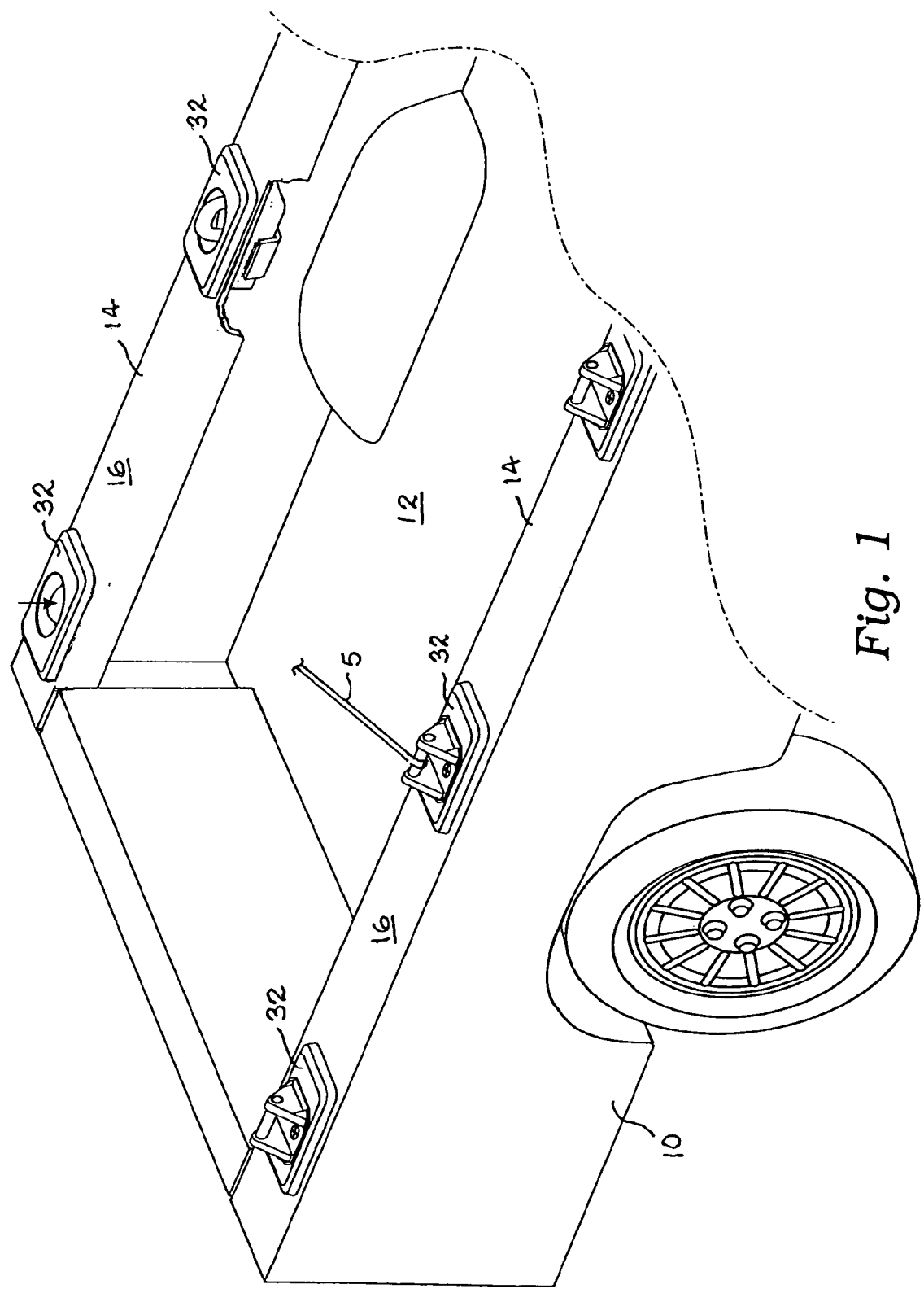
FIG. 1 is a perspective view of the preferred embodiments of the invention.
Figure 2:
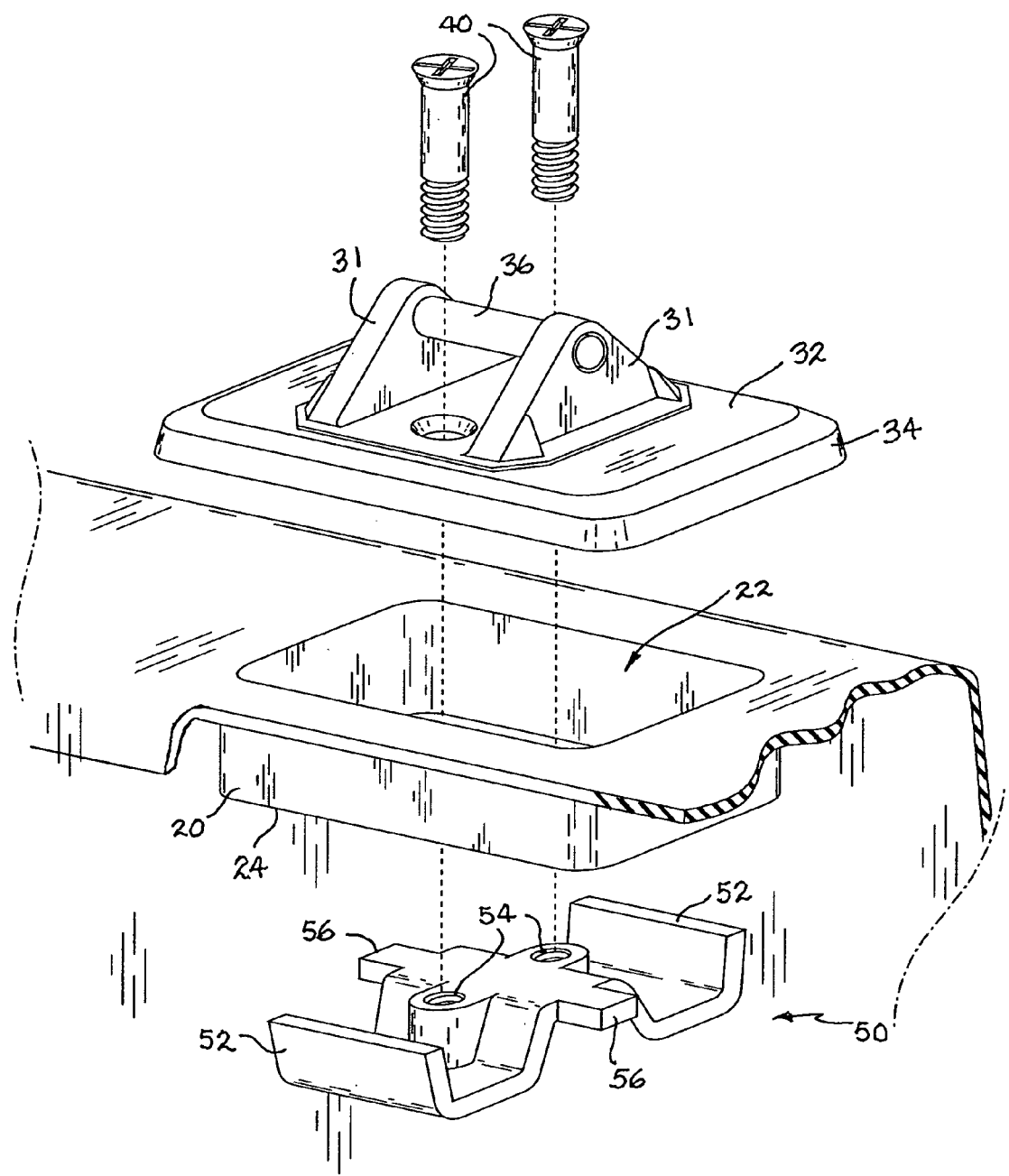
FIG. 2 is an exploded perspective view of one embodiment thereof.
Figure 3:
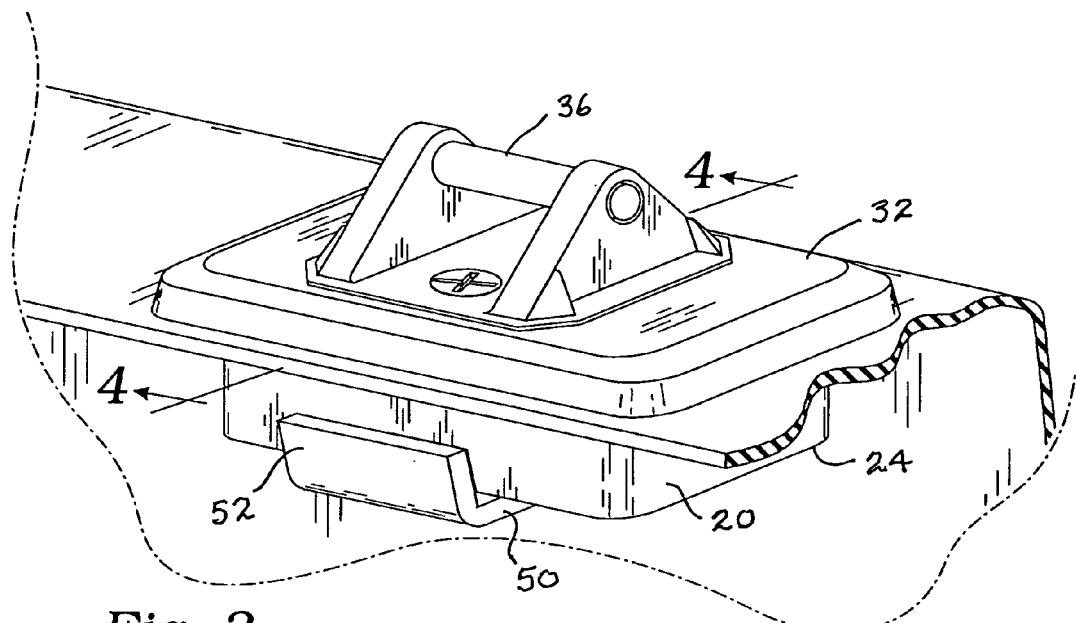
FIG. 3 is a perspective view thereof.
Figure 4:
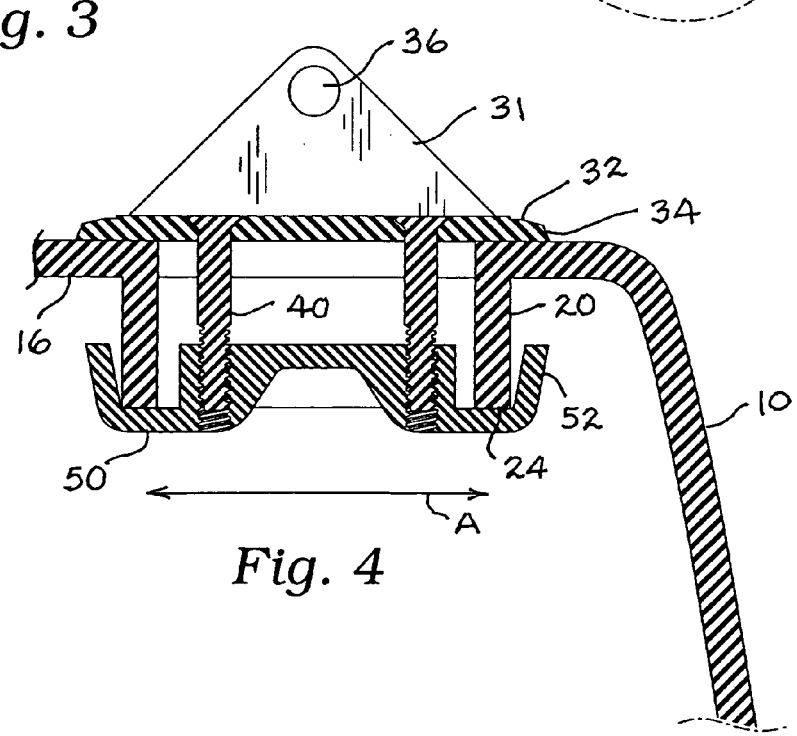
FIG. 4 is a section view taken along line 4—4 of FIG. 3.

The above described drawing figures illustrate the invention in at least one of its preferred embodiments, which is further defined in detail in the following description.

The present invention is a cargo anchor apparatus 30 (cargo anchor), used for tying-off lines 5 for securing cargo in, for instance, the open bed 12 of a truck 10. The truck 10 has a pair of bed sidewalls 14 which are separated by the open bed 12. Each of the truck sidewalls 14 provides an upfacing top panel 16, and, in each of the top panels 16, at least one downwardly extensive flange tube 20 (FIGS. 2–7) defining a panel aperture 22. The flange tube 20 is tubular in shape and terminates downwardly at a peripheral edge 24.

The cargo anchor 30, of which preferably at least two are used, one on each of the opposing top panels 16, comprises a cover plate 32 having a peripheral edge 34 extensive for covering the panel aperture 22, and an anchor bar 36 for securing line 5. The cargo anchor 30 further provides a locator plate 50. The cover plate 32 and the locator plate 50 are mutually engaged by a means for fastening 40, such as the screws shown in FIGS. 2, 4, 5 and 7 which are extensive between the cover 32 and locator 50 plates. The locator plate 50 provides, as described below, a means for engagement with the flange tube 20, so as to limit movement of the cargo anchor 30, such that a space (not shown) between the panel aperture 22 and the peripheral edge 34 of the cover plate 32 cannot occur, as this would be unsightly and allow water to drip through the top panel 16. In other words, the cover plate 32 must, at all times, completely cover the panel aperture 22. Since the cargo anchor 30 must be free to move to a certain extent within the flange tube 20, without steps taken in the design of the locator plate 50 and its relationship with flange tube 20, such an unsightly space might appear.

The engagement means in the locator plate 50, as mentioned above, includes opposing upturned lips 52 which are positioned for engagement on opposing sides of the flange tube 20. This is clearly shown in the cross-section illustrations of FIGS. 4 and 7. This construction limits lateral movement of the cover plate 32 in the direction shown by arrow "A" in FIG. 4. This construction also enables the cargo anchor 30 to exert a clamping force on flange tube 20 to secure the cargo anchor 30 in place on the truck top panel 16 when screws 40 are tightened. To accomplish this, locator plate 50 provides threaded screw holes 54 for receiving screws 40. The engagement means also includes opposing extended tabs 56 of such girth as to engage by potentially abutting two opposing sides of the flange tube 20. It is noted that the sides of the flange tube 20 engaged by the extended tabs 56 are orthogonal to the opposing sides of the flange tube 20 that engage the upturned lips 52. Extended tabs 56 limit movement of the cover plate 32 in the direction shown by arrow "B" in FIG. 5.

In the preferred embodiment, shown in FIGS. 2–5, the anchor bar 36 is fixed above the cover plate 32 and is freely used for tying-off the anchor line 5. Anchor bar 36 is held in place by standoffs 31 integral with cover plate 32 a rigid structural enablement.

Figure 5:
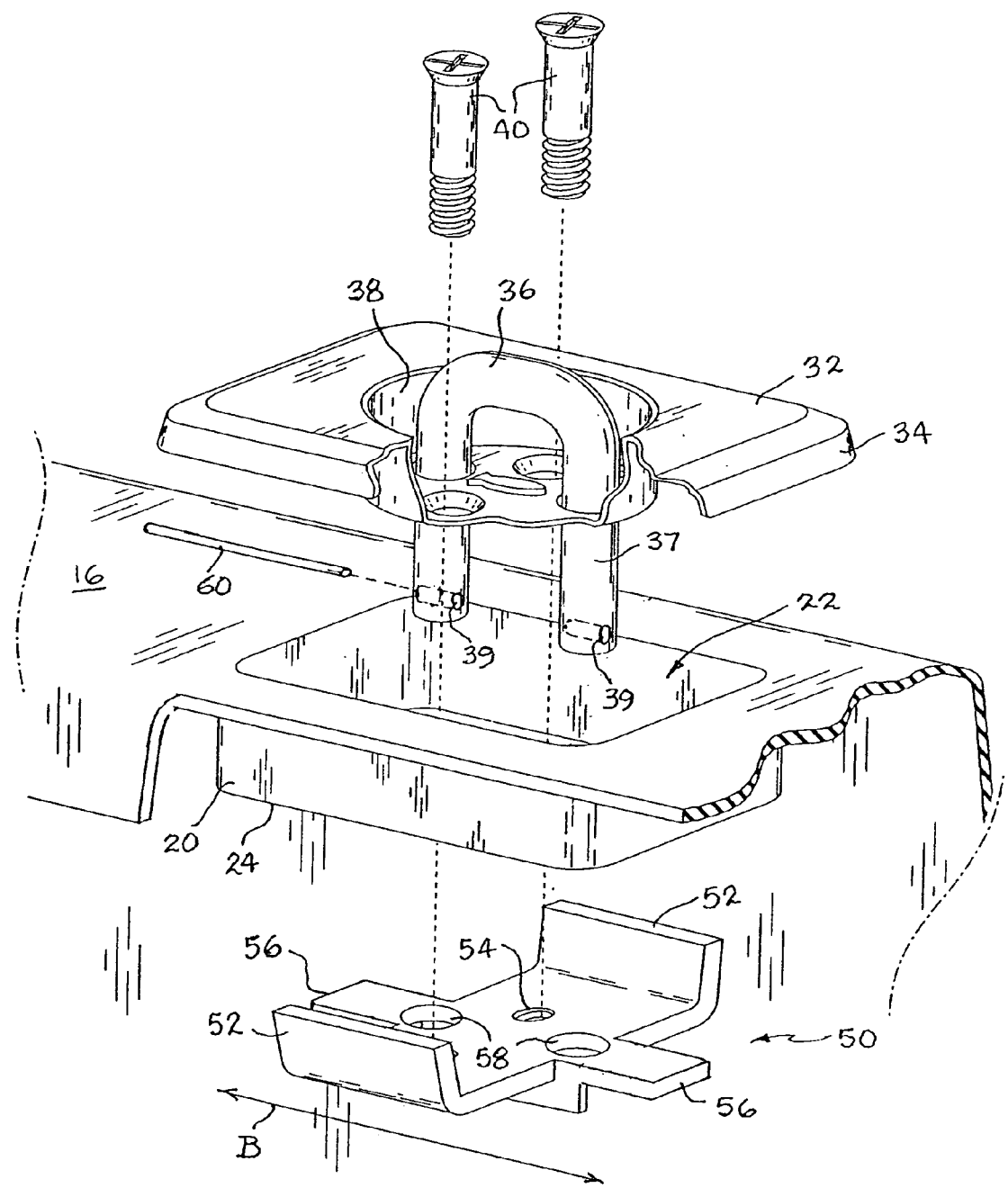
FIG. 5 is an exploded perspective view of another embodiment thereof.
Figure 6:
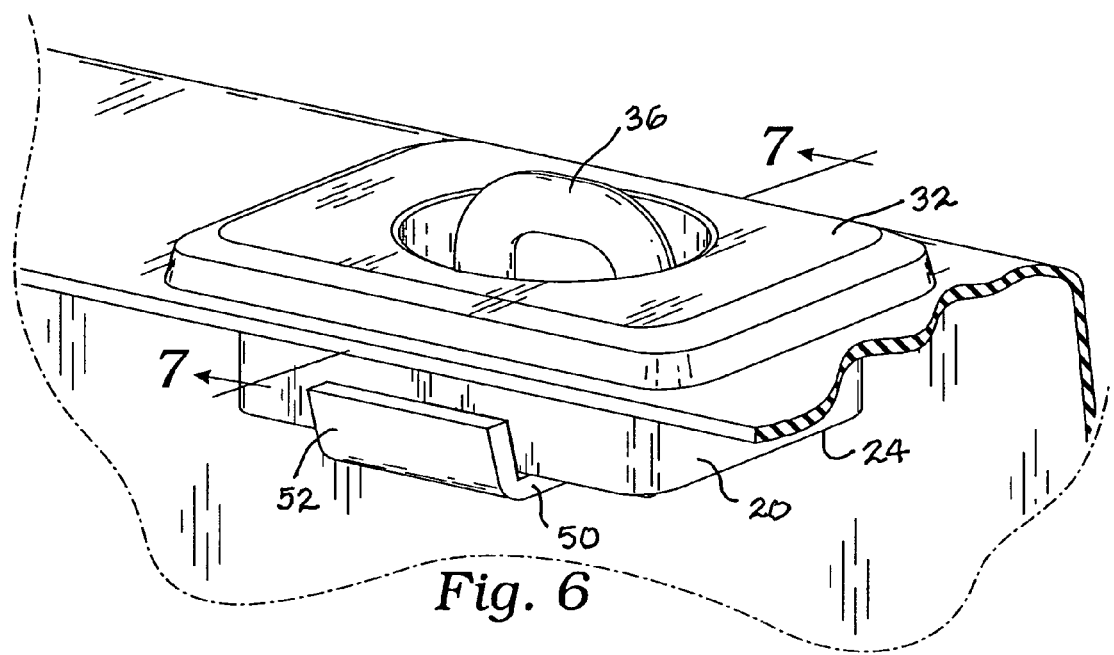
FIG. 6 is a perspective view thereof.
Figure 7:
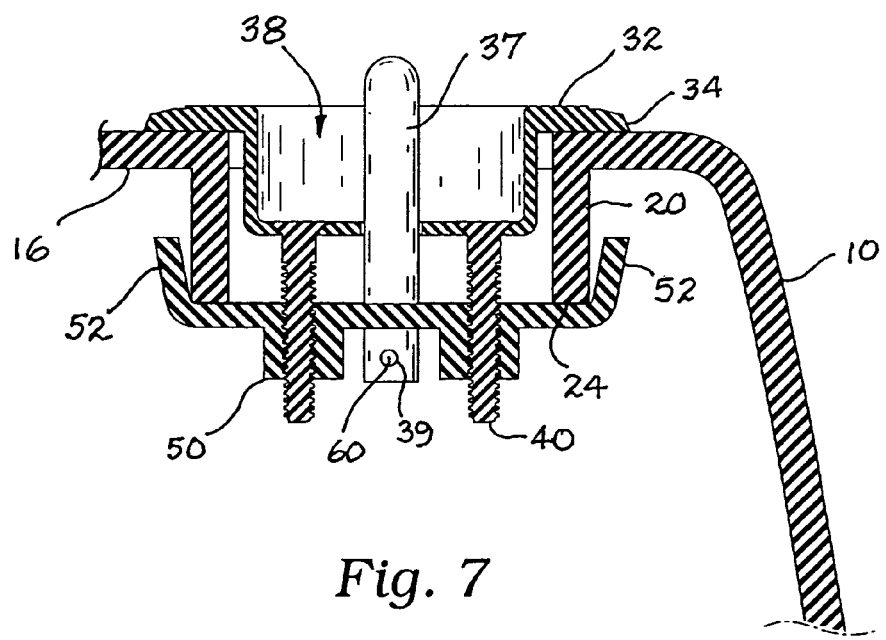
FIG. 7 is a section view taken along line 7—7 of FIG. 6.

In the further preferred embodiment, shown in FIGS. 5–7, the anchor bar 36 is not fixed in place, but rather is vertically movable between an extended "up" position and a retracted "down" position. FIGS. 5–7 illustrate the "up" position, while FIG. 1 shows both the "up" position on the right side of the illustration, and the "down" position on the left side of the illustration. The advantage here, is that the anchor bar 36, when not in use, can be hidden. In the "down" position, the anchor bar is contained within a cover plate well 38. In order to move vertically, the anchor bar 36, in this embodiment, is part of an inverted "U" shaped rod 37. The rod 37 extends through two clearance holes 58 in the locator plate 50. See FIG. 5. Once inserted into the clearance holes 58, the rod 37 exposes a pair of pin holes 39 which receive an interference pin 60 for capturing rod 37 in locator plate 50. It should be noticed, as shown best in FIG. 5, that the cover plate well 38 provides clearance holes for both the two legs of rod 37 and also for fasteners 40.

It is the juxtaposition of the upturned lips 52 and the extended tabs 56 in limiting lateral movement of cover plate 32 in the "A" and the "B" directions that provides advantage of the present invention over the prior art. Clearly, the trivial engineering solution to the present problem of fitting the cargo anchor 30 within the flange tube 20 of the truck top plate 16 is to make the anchor 30 tight-fitting within the flange tube 20. This solution is not satisfactory because the anchor 30 is provided as an aftermarket item that must be designed to fit a plurality of flange tube 20 sizes. In its role as a piece of universal hardware, the outside dimension of the extended tabs 56 and the upturned lips 52 can be selected to fit all variations of the flange tube 20, for the various production trucks as well as custom adaptations, while assuring that the peripheral aperture 22 is fully covered by cover plate 32.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. An apparatus comprising in combination: a truck having an open bed and a pair of truck sidewalls separated by the open bed; each of the truck sidewalls providing an upfacing, horizontally disposed top panel, and in each of the top panels, at least one vertically disposed flange tube defining a panel aperture in the top panel, the flange tube terminating downwardly at a peripheral edge; and a cargo anchor; the cargo anchor comprising a horizontally disposed cover plate extensive for fully covering the panel aperture, and an anchor bar for securing an anchor line, and a horizontally disposed locator plate, the cover plate and the locator plate mutually engaged by a means for fastening extensive therebetween; the locator plate providing opposing upturned lips positioned exterior to the flange tube so as to limit motion of the locator plate and the cover plate in a first lateral direction, and opposing tabs positioned interior to the flange tube so as to limit motion of the locator plate and the cover plate in a second lateral direction orthogonal to the first lateral direction; whereby a space between the cover plate and the panel aperture cannot occur.

2. The apparatus of claim 1 wherein the anchor bar is vertically movable.

3. The apparatus of claim 2 wherein the anchor bar is positionable within a cover plate well.

\* \* \* \* \*